United States Patent
Six et al.

(10) Patent No.: US 10,063,610 B1
(45) Date of Patent: Aug. 28, 2018

(54) APPARATUS AND METHOD FOR DYNAMICALLY PROVIDING WEB-BASED MULTIMEDIA TO A MOBILE PHONE

(71) Applicant: OPEN INVENTION NETWORK LLC, Durham, NC (US)

(72) Inventors: Scirocco Michelle Six, Sunnyvale, CA (US); Sterling Mace, San Francisco, CA (US); Rajeev Raman, Cupertino, CA (US); Stephen Mui, Santa Clara, CA (US); Jason Fisher, San Francisco, CA (US)

(73) Assignee: Open Invention Network, LLC, Durham, NC (US)

( * ) Notice: Subject to any disclaimer, the term of this patent is extended or adjusted under 35 U.S.C. 154(b) by 128 days.

(21) Appl. No.: 15/084,075

(22) Filed: Mar. 29, 2016

Related U.S. Application Data

(63) Continuation of application No. 14/088,754, filed on Nov. 25, 2013, now Pat. No. 9,300,619, which is a continuation of application No. 11/937,441, filed on Nov. 8, 2007, now Pat. No. 8,601,018.

(60) Provisional application No. 60/866,098, filed on Nov. 16, 2006, provisional application No. 60/864,830, filed on Nov. 8, 2006.

(51) Int. Cl.
| | |
|---|---|
| *G06F 7/00* | (2006.01) |
| *G06F 17/30* | (2006.01) |
| *H04L 29/06* | (2006.01) |
| *H04L 12/58* | (2006.01) |
| *H04L 12/26* | (2006.01) |
| *H04L 29/08* | (2006.01) |

(52) U.S. Cl.
CPC ...... *H04L 65/602* (2013.01); *G06F 17/30038* (2013.01); *G06F 17/30053* (2013.01); *H04L 43/106* (2013.01); *H04L 51/04* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 5,999,694 A * | 12/1999 | Yasuda | ............ | G11B 27/105 386/248 |
| 6,625,750 B1 * | 9/2003 | Duso | ............ | G06F 11/2028 714/11 |
| 6,965,646 B1 * | 11/2005 | Firestone | ............ | H04N 21/236 375/240.26 |
| 7,007,062 B1 * | 2/2006 | Serenyi | ............ | H04L 29/06 709/203 |
| 7,222,354 B1 * | 5/2007 | Ching | ............ | H04N 5/4401 348/E5.006 |
| 7,313,593 B1 * | 12/2007 | Pulito | ............ | G06Q 10/10 370/260 |

(Continued)

*Primary Examiner* — Hasanul Mobin

(57) ABSTRACT

An apparatus and method for dynamically providing web-based multimedia to a mobile phone are described. According to one embodiment, an RSS feed is received that references multimedia files meeting one or more criteria. A playlist is generated dynamically from the multimedia files. The playlist is a single virtual multimedia file. An updated RSS feed is received that references one or more additional multimedia files meeting the one or more criteria. A second playlist is generated dynamically from the multimedia files and the one or more additional multimedia files.

20 Claims, 6 Drawing Sheets

(56) References Cited

U.S. PATENT DOCUMENTS

| | | | |
|---|---|---|---|
| 2003/0163815 A1* | 8/2003 | Begeja | H04N 7/17318 725/46 |
| 2004/0199657 A1* | 10/2004 | Eyal | G06F 17/30038 709/231 |
| 2005/0008240 A1* | 1/2005 | Banerji | H04N 5/2624 382/238 |
| 2005/0038877 A1* | 2/2005 | Gupta | G06F 17/30017 709/219 |
| 2006/0010167 A1* | 1/2006 | Grace | H04L 67/1095 |
| 2006/0161635 A1* | 7/2006 | Lamkin | G06F 17/30041 709/217 |
| 2006/0168156 A1* | 7/2006 | Bae | H04L 67/1008 709/220 |
| 2006/0259949 A1* | 11/2006 | Schaefer | G06F 17/30082 726/1 |
| 2007/0116435 A1* | 5/2007 | Kim | G10L 19/167 386/241 |
| 2007/0186003 A1* | 8/2007 | Foster | H04L 29/06027 709/231 |
| 2007/0242630 A1* | 10/2007 | Yoo | H04M 1/72522 370/310 |
| 2007/0268883 A1* | 11/2007 | Quelle | H04H 60/74 370/349 |
| 2007/0282905 A1* | 12/2007 | Karlberg | G06F 17/30053 |
| 2008/0141307 A1* | 6/2008 | Whitehead | H04N 7/173 725/46 |

* cited by examiner

APPARATUS AND METHOD FOR DYNAMICALLY PROVIDING WEB-BASED MULTIMEDIA TO A MOBILE PHONE

CROSS-REFERENCE TO RELATED APPLICATIONS

This application is a continuation of application Ser. No. 14/088,754, entitled "APPARATUS AND METHOD FOR DYNAMICALLY PROVIDING WEB-BASED MULTIMEDIA TO A MOBILE PHONE", filed on Nov. 25, 2013, now issued U.S. Pat. No. 9,300,619, issued on Mar. 29, 2016, which is a continuation of application Ser. No. 11/937,441, entitled "APPARATUS AND METHOD FOR DYNAMICALLY PROVIDING WEB-BASED MULTIMEDIA TO A MOBILE PHONE", filed on Nov. 8, 2007, now issued U.S. Pat. No. 8,601,018, issued on Dec. 3, 2013, which is a non-provisional of application No. 60/866,098, entitled "APPARATUS AND METHOD FOR DYNAMICALLY PROVIDING WEB-BASED MULTIMEDIA TO A MOBILE PHONE", filed on Nov. 16, 2006, and application No. 60/864,830, entitled "APPARATUS AND METHOD FOR DYNAMIC STREAMING OF MULTIMEDIA FILES", filed on Nov. 8, 2006, the entire contents of each are hereby incorporated by reference.

FIELD

The field of the invention relates generally to computer systems and more particularly relates to an apparatus and method for dynamically providing web-based multimedia to a mobile phone.

BACKGROUND

Real Time Streaming Protocol (RTSP) is used to establish a connection between a client and a server so that a multimedia file such as a 3GP, or MP4 file can be streamed from the streaming server to the client using Real-Time Transport Protocol (RTP). To stream a set of files, the client has to request each file separately, and a separate RTSP connection is established for each file with a separate RTP, Real-Time Control Protocol (RTCP) port pair establishment.

In a conventional way as described in the references incorporated herewith, a separate RTSP connection needs to be established for each streaming file. An RTSP connection establishes separate RTP and RTCP ports: an RTP port, RTP packet can carry any data with real-time characteristics, such as interactive audio and video. On a separate RTCP port, RTCP packets provide information about data transfer quality that a streaming application can use to make local adjustment. For example, if network congestion is detected, the streaming application could lower the data rate or the resolution of the streaming file. When a request for streaming multiple multimedia files is made, the process of opening and closing a series of RTSP and RTP connections is repeated until all the files are streamed.

This extraneous activity of repeatedly opening and closing RTSP and RTP connections can lead to more time and network bandwidth being consumed by the connection overhead than by the streaming of the media files themselves. This is particularly undesirable when the communication bandwidth is limited or many smaller-sized multimedia files are streamed. Thus, there is a need for an efficient multimedia delivery mechanism to minimize the RTSP and RTP connection overhead.

Really Simple Syndication (RSS) is an XML based Web feed format that contains a summary of content from an associated web site or a podcast publisher. A user who wishes to subscribe to a frequently-updated web content or a podcast obtains an RSS feed from the publisher and checks for an update on the feed using software called an "RSS reader" or "an aggregator", which occasionally re-visits the podcast website. If an update is available, it is downloaded to the user's computer or multimedia device such as an MP3 player or a cellular phone. Since the information regarding the update status on the subscribing podcast is easily available from the RSS feed, the RSS reader need not compare the podcast to download with the latest local version. However, the aggregation of podcasts is limited to the RSS channels that a user subscribes to, thus there is a need for a dynamic aggregation mechanism that provides flexibility and configurability of RSS channels.

SUMMARY

A method and system for dynamically providing web-based multimedia to a mobile phone are described. According to one embodiment, an RSS feed is received that references multimedia files meeting one or more criteria. A playlist is generated dynamically from the multimedia files. The playlist is a single virtual multimedia file. An updated RSS feed is received that references one or more additional multimedia files meeting the one or more criteria. A second playlist is generated dynamically from the multimedia files and the one or more additional multimedia files.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
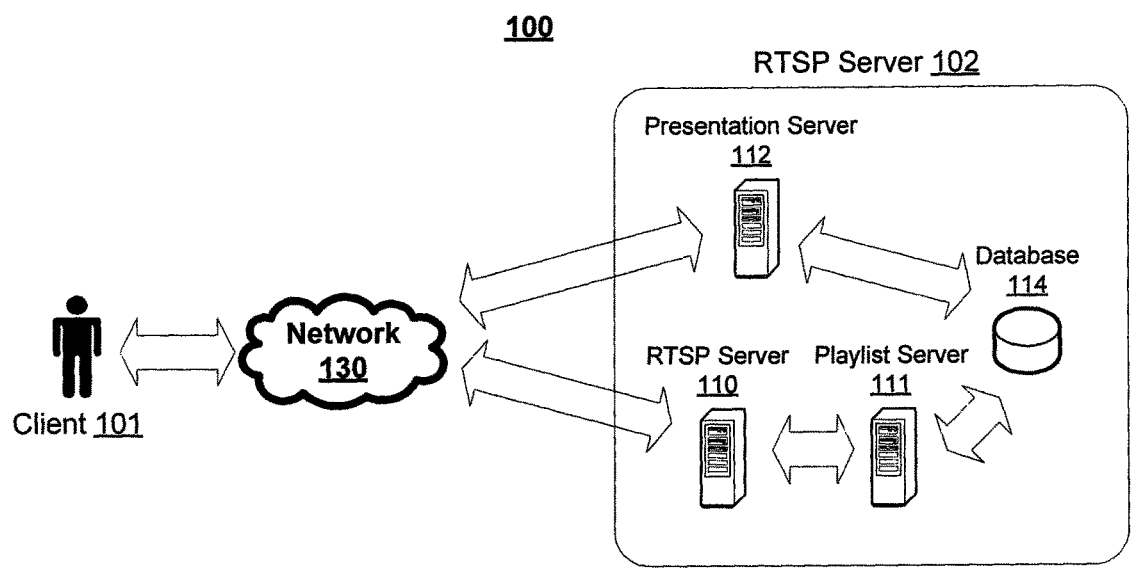
FIG. 1 illustrates a block diagram of an exemplary RTSP system, according to one embodiment.

An apparatus and method for dynamically providing web-based multimedia to a mobile phone are described. According to one embodiment, an RSS feed is received that references multimedia files meeting one or more criteria. A playlist is generated dynamically from the multimedia files. The playlist is a single virtual multimedia file. An updated RSS feed is received that references one or more additional multimedia files meeting the one or more criteria. A second playlist is generated dynamically from the multimedia files and the one or more additional multimedia files.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

According to one embodiment, when multiple multimedia files are streamed, the RTSP connection overhead is minimized by combining the multiple multimedia files into a single logical multimedia file to facilitate compact and efficient file streaming. A single logical multimedia file is created by dynamically combining multiple physical files, calculating the accumulated play time, and appropriately modifying headers of individual video and audio segments of the files. According to one embodiment, more than one version of a logical multimedia file is created depending on multiple factors such as bandwidth requirements, hardware or device types on the client side, and the network carrier's regulations and requirements. For each version, the frame rate and the resolution of the file are adjusted and the header information of the file is modified correspondingly.

According to one embodiment, a list of streaming files is dynamically constructed so that the constituent files can be reordered, added or deleted. Since each constituent file includes one or multiple audio or video packets in it, as the construction of the single logical file containing the constituent streaming files is dynamically modified, the headers of each reconstructed packet need to be modified by updating the timestamp in the headers. As the set of multimedia files is streamed, a new file can be dynamically added to or inserted into the list. If a file being removed is not yet streamed or is presently being streamed, the file can be dynamically removed from the list and will not be streamed to the client 101.

FIG. 1 is a block diagram of an exemplary RTSP system 100, according to one embodiment. RTSP system 100 includes RTSP server 110 and Presentation Server 112 that communicate with clients 101 via network 130. Presentation server 112 provides user interface and information presentation to client 101. For example, presentation server 112 might be a Web server but is not restricted thereto and is capable of exchanging data with client 101. Client 101 requests for the streaming of a set of multimedia files. RTSP server 110 receives the request and subsequently delegates the request to playlist server 111. Playlist server 111 creates a playlist in response to RTSP server 101's request by searching database 114, where multimedia files are collectively stored, updated and maintained. The playlist is returned to RTSP server 110 where a single logical multimedia file is constructed and streamed to client 101.

According to one embodiment, network 130 is a high-speed broadband network, a Public Switched Telephony Network (PSTN), a Local Area Network (LAN), a Wide Area Network (WAN), an Integrated Services Digital Network (ISDN) or any other type of network that enables two or more devices to exchange information. Furthermore, network 130 may be in whole or in part a Wireless Area Network (WAN), such that client 101 may be wireless devices, cellular phones, PDA, or any other type of wireless communication device.

Database 114 may be of any type of database or file storage device, for example, a relational database, a distributed file system, a Redundant Array of Independent Drive (RAID), a Network Attached Storage (NAS) or any other type of storage devices. Database 114 may also refer to the contents or files available on the Internet or network 130.

In a multimedia container file such as 3GP or MPEG-4 (MP4), video and audio components are compressed using video and audio codecs. During an RTSP connection, the RTP and RTCP port pair is conveyed to client 101. The contents on database 114 are streamed using RTP protocol via the established RTP port. RTP packets comprise the following components: RTP header, RTP Payload Header, Compressed Bit Stream. As an example, if the RTP payload is H.263 compressed video, RTP packets will have RTP header, H.263 payload header, and H.263 compressed bit stream.

Figures 2, 3:
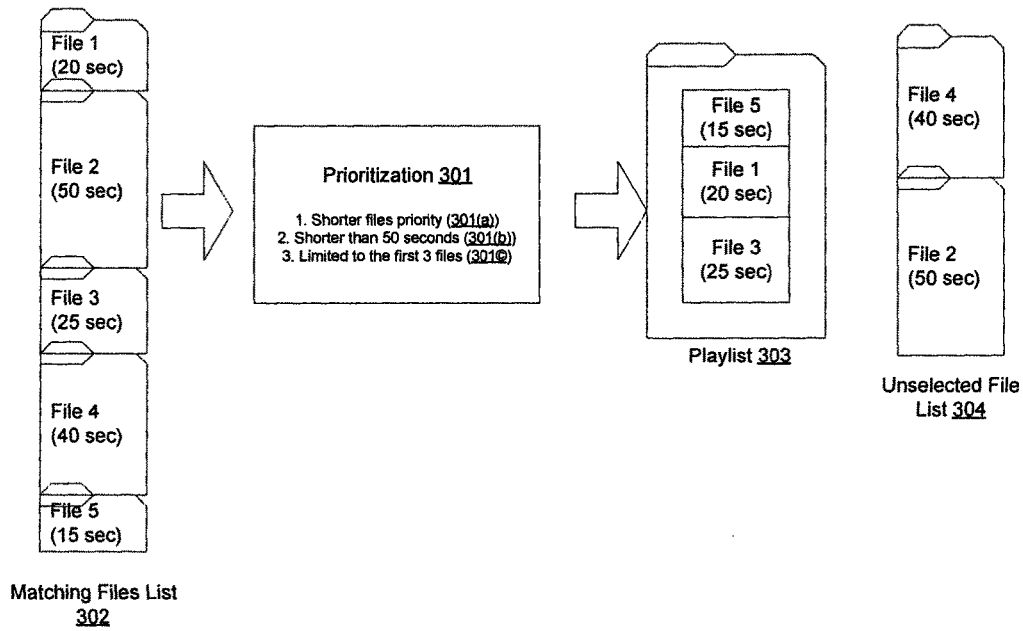
FIG. 2 illustrates an exemplary structure of a multimedia container file, according to one embodiment.
FIG. 3 illustrates an exemplary process of playlist construction, according to one embodiment.

FIG. 2 shows an exemplary structure of a multimedia file container, according to one embodiment. Each multimedia container file consists of a header 201, a video component 202, and an audio component 203. Each audio and video component is composed of one of more sub-components: for example, the video component 202 is composed of N video sub-components such as V1, V2 . . . VN, and the audio component 203 is composed of M audio sub-components such as A1, A2 . . . AM. The header 201 includes information about the multimedia file such as the timestamp, the author, the codec, the version, the frame rate, the playtime, etc. As is shown in FIG. 2, the sub-components of a file container may be of irregular size and length, and the total number of video and audio sub-components may be different.

FIG. 3 shows an exemplary process of playlist construction 300. A playlist can be specified by client 101 or can be constructed by playlist server 111 at the request of client 101. Certain restrictions and conditions can be applied on the playlist; for example, shorter files are given higher priority (301(a)), maximum playtime is limited to 50 seconds (301(b)), or no more than three files are streamed (301(c)). Certain statistical conditions can also be applied, such as most-watched file first, or most recent updates first, excluding files seen before, etc. As the files on the playlist are identified and found on database 114, playlist server 111 provides the matching file list 302 to RTSP server 110 to undergo prioritization process 301. Applying 301(a), the five files, Files 1-5 of the matching files list 302 are reordered in the order of File 5, File 1, File 3, File 4 and File 2, File 5 being the shortest and File 2 being the longest. And the additional conditions of 301(b) and 301(c) excluded File 4 and File 2 thereby creating playlist 303 including only three files, File 5, File 1 and File 3. The applications of priority, restrictions and conditions are not limited to these examples, and any combinations thereof may be used as RTSP server 101 permits.

According to one embodiment, a single multimedia file is created from multiple multimedia files by stitching both audio and video components in proper order to achieve optimal file streaming. Given the network speed and the size of the audio and video components on the list, a different stitching algorithm may be adopted to facilitate uninterrupted streaming and maximize network bandwidth.

A single logical file is dynamically created by reconstructing a single compressed bit stream out of the compressed bit streams of the constituent files in the set. A single synchronizing source (SSRC) is selected for the logical file, and separate audio and video components are constructed as the two components are streamed via separate RTP packets. A sequence number in each sub-component is incremented sequentially starting from the initial value. An RTP packet's timestamp is created using a sampling clock instead of a system clock for the entire logical file. A different sampling clock is used for the audio and video components to achieve maximum efficiency without being interdependent on other components. Given the network speed, an optimal sampling clock is chosen and generated in realtime. The compressed bit stream in the payload of the RTP packets corresponding to the logical file must correspond to a single decodable file. The new RTP timestamp is updated in the RTP header as well as the temporal reference field in the compressed bit stream. Therefore, the compressed bit stream is changed in realtime without decoding the bit stream as the RTP packets are generated.

According to one embodiment, RTSP server 110 is adaptive to a client 101's viewing interests. Playlist server 111 provides a set of matching files 302 at the streaming request from client 101. Files within the set 302 are streamed using priority queues 301 based on priority categories. Playlist server 111 keeps track of the files that are streamed to the client 101 and updates the streaming history on database 114, accordingly. Next time when the set is to be streamed to the client 101, the priority scheme is computed dynamically and the files are reprioritized and streamed accordingly.

According to one embodiment, database 114 contains a list of advertisement video clips. An appropriate advertisement clip is dynamically chosen and inserted into playlist 303 based on the client 101's profile, personal settings, the title and/or the description of the channel, and any other factors. Client 101 may be offered free or reduced rate service subscription contingent upon agreeing to receive advertisement video clips.

Really Simple Syndication (RSS) is an XML-based Web feed format that allows users to update contents and subscribe to their favorite Web sites. The present system and method, in particular, uses RSS as a publishing/syndication format used for picture, audio, or video podcasts. A podcast is a multimedia file distributed over the Internet using syndication feeds, for playback on mobile devices, personal computers, Sony PSPs, Apple iPods, or any other multimedia device with network connectivity. This has lead to RSS being one of the most popular ways to manage audio and video podcast subscriptions.

Figure 4:
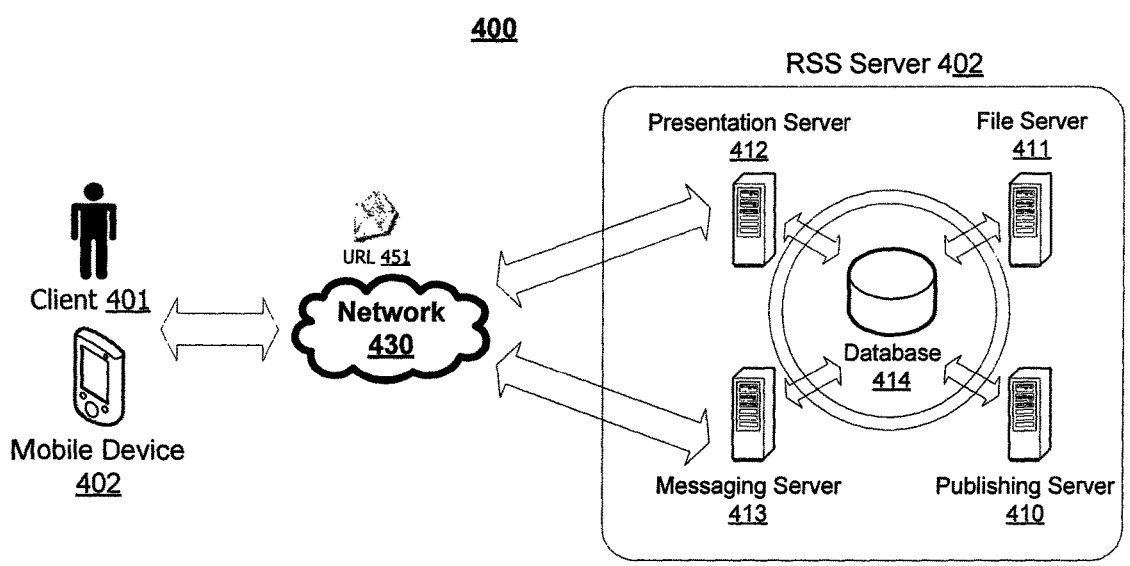
FIG. 4 illustrates an exemplary RSS system, according to one embodiment.

FIG. 4 shows an exemplary RSS system 400 wherein RSS server 402 communicates with one or more clients, collectively called client 401 hereinafter, or client 401's mobile device 402 via network 430. RSS server 402 includes a publishing server 410, file server 411, presentation server 412, messaging server 413 and database 414. Publishing server 410 communicates with client 401 through presentation server 412 which is responsible for front-end processes such as a user interface (UI) and displaying contents to and receiving user interactions from client 401 in an appropriate format. Publishing server 410 also communicates with client 401 through messaging server 413, which is responsible for processing emails, text messages, voice messages, etc.

According to one embodiment, a uniform resource locator (URL) 451 is created to link to a channel. A channel is both a mechanism for organizing content and a conduit for transmitting content on database 414 to and from a client 401 when the client 401 accesses the channel on a Web or mobile device by a click of a button, an email or by text messaging.

Channels are created in various ways: Publishing server 410 may create public channels such as headline news, stock market watch, travel information, weather, etc. that are of general interest to the public. A client 401 may also create his or her own private channel where the client 401 can post and update a collection of video clips. Another client 401 may also link to the channel in such a way as a favorite link is created on a Web browser. According to one embodiment, publishing server 410 offers the creation of a virtual channel. A virtual channel is created as if a new channel is created, however the virtual channel is simply a collection of contents gathered from existing channels. For example, client 401 can create a virtual channel using one or more keywords and publishing server 410 searches and provides the content for the virtual channel to client 401 as if it were a new channel. In one embodiment, the content may be stored as a channel and presented upon any future requests from client 401 for the channel. In another embodiment, only the search terms for the virtual channel are stored. The search term is processed dynamically when client 401 requests the channel or at intervals the search may be performed, and client 401 is notified that new content is available. From the client's perspective, an actual and a virtual channel are not necessarily distinguishable from each other. The construction of virtual channels avoids unnecessary duplicates of content, and a client 401 is capable of searching channels using keywords.

The URL for a channel may be obtained in various ways: at the time a channel is created, the associated URL is automatically created by publishing server 410 so that when client 401 connects to publishing server 410, the URL is available on client 401's channel list. Another client 401 may encounter the URL while searching, or client 401 may receive the link to the channel from an email. Alternatively, the URL may be available on a Web site so that client 401 can simply click on the link to connect to the associated channel on publishing server 410. Client 401 can even manually type the URL to get connected to the associated channel. Nevertheless, URL 451 serves as a unique identifier or a destination to a service channel hosted on RSS system 400.

According to one embodiment, client 401 may post multimedia files to publishing server 410 either on the preexisting channel or a newly created channel. When a new channel is created, a new unique URL is created pointing to the channel. The URL to a channel may contain references to client 401's personal settings, priority settings, network connection speed setting, etc. in addition to the destination of the channel.

Database 414 also maintains the list of all available channels and the corresponding attributes to the channel such as the timestamp, the owner, the list of authorized subscribers, the alphanumeric channel identifier, and the statistics on the channel, such as number of subscribers, number of downloads, etc. Fileserver 411 may be any file storage device; for example, a distributed file system, Redundant Array of Independent Drives (RAIDs), a Network Attached Storage (NAS), or any other type of storage devices. Database 414 may also refer to the contents or files available on the Internet or network 430 or database 114 of FIG. 1.

According to one embodiment, publishing server 410 includes an RTSP server 102 and a playlist server 111. When a URL request for a channel arrives, publishing server 410 retrieves identifiers by parsing the URL 451 and passes along the request to the playlist server 111. The playlist server 111 searches database 414 for matching files and creates a playlist 302 of the matching files. After playlist 302 is returned from the playlist server 111, the RTSP server 102 references the URL identifiers to construct a new playlist 303 using prioritization process 301. A single logical streaming file constructed from the new playlist 303 is streamed to client 401 over network 430.

According to one embodiment, URL 451 of RSS system 400 has a format of a typical URL (e.g., protocol.//servername Iresourcename) proceeded by one or more identifiers. For example, URL 451 may look like the following: rtsp.// xxx.com/abc123?Length=10,HQ, wherein abc123 is an alphanumeric identifier unique for the associated channel. Database 414 relates the channel identifier to the attributes of the channel such as the title, preferred bandwidth, access authorization, etc. The following identifiers provide further details of the URL request: Length=10 filters and limits the play time to 10 seconds and HQ defines the streaming quality set as "high quality."

According to one embodiment, identifiers of URL 451 include a token for access authorization. For example, client 401 visits an online shop and desires to purchase a multimedia file. The online merchant sells the multimedia file to client 101 and, as the proof of the payment, sends an encrypted validation of the purchase in an electronic format such as an email, a text message, an SMS message, or an encrypted file. Client 401 submits the URL containing the encrypted validation and downloads the multimedia file from the merchant's online shop.

According to one embodiment, identifiers of URL 451 include a safety token that blocks unauthorized access or allows limited-access to content. The safety token may be provided as encrypted and updated by publishing server 410; thus, only the authorized clients having the safety token are allowed to access the channel.

According to one embodiment, URL 451 includes references to user settings such as notification options. A subscriber to a channel may receive a notification of updates to a channel by an email, an instant message, or a phone call, etc. Notifications may be sent to a subscriber when certain conditions are met, such as a certain number of updates available since last access to the channel, when specific updates are available during a certain time frame.

URL 451 allows intelligent retrieval of channel data. URL 451 may reference information that is static to the channel and can be configured by the channel owner or other authorized subscribers. Examples of referenced information includes the channel title, topic, the date and time of channel creation, etc. URL 451 may reference a client 401's settings that are configurable as a channel request is made. Client 401, for example, is on a wired network so that client 401 can temporarily change the network quality setting to "HQ" to allow streaming high definition videos. Client 401 can limit the streaming quality setting to low quality ("LQ") when only a slower network connection is available. URL 451 may reference statistical data that is continuously updated on database 414 such as the counter for downloads, the ratings for a channel, etc.

According to one embodiment, a client's mobile device 402 may be equipped with a client software program that automates RSS feeds and update requests: for example, a software program written to conform to the Binary Runtime Environment for Wireless (BREW) or to the Java ME standard. Whether a channel update request is automated by a client's mobile device 402 or manually requested by client 401, publishing server 410 performs an update on the channel by scanning an update on database 414.

According to one embodiment, publishing server 410 is capable of updating a channel by searching particular podcast hosting sites or the Internet, thereby synchronizing the podcasts or multimedia content on database 414 for later streaming to client 401 or client's mobile device 402. This process is referred to herein as "content aggregation." According to another embodiment, publishing server 410 scans for updates on the channel that client 401 subscribes to and will notify client 401 via presentation server 412 or messaging server 413 when an update is available on the channel. The channel update request may be made manually by client 401 or automatically by client software installed on client's mobile device 402. Alternatively, publishing server 410 may voluntarily search for new podcasts or multimedia content from the Internet, which are later provided to client 401. During content aggregation, publishing server 410 starts downloading the file to file server 411. After the download is complete, publishing server 410 records the file location and history and updates the channel information on database 414.

According to one embodiment, a hashing algorithm may be used to determine that an update for a file is available. As the file size gets bigger, a bit by bit comparison becomes computationally more expensive: therefore, a special hashing algorithm is used for file comparison. When multiple copies of the same content exist, if the copies have different attributes such as titles and the date of creation, it is desirable to save only a single copy. The headers of the files under comparison are first examined to determine if there is a potential match. If the result of the header comparison shows that the headers include substantially similar data, a more-thorough comparison is made: various parts of a first file are fed to the hashing algorithm to create a unique numeric pattern that is compared with the output of a second file. The computation time is significantly decreased by a hashing comparison without sacrificing the validity of the comparison. As a new copy is introduced to the system, the hashing comparison confirms that the updated file is different from the last updated file. If confirmed, the updated file is downloaded by publishing server 410.

According to one embodiment, synchronization or downloading may involve transcoding of the original contents. Due to the variety of network connection speeds, mobile devices, and network services, transcoding may be done in more than one format. Transcoding may be done in parallel with or after the download.

RSS Ingestion.

RSS ingestion allows clients 401 to create channels on a mobile device 402 that automatically track a podcast. The contents of the podcast are automatically downloaded, transcoded, and added to client 401's channel. RSS ingestion more particularly, refers to publishing server 410 that takes as input a URL 451 pointing to an XML description file in one of several well known RSS description formats. This file provides publishing server 410 with a list of URL which point to multimedia files. One at a time publishing server 410 downloads the files to file server 411, transcodes the files and populates database 414 with meta-information relevant to the files, thereby making the contents of the file viewable in client 401's channel.

According to one embodiment, publishing server 410 is capable of automatically ingesting feeds provided by content partners. In this embodiment, access authorization or safety token URL identifiers may be utilized to preserve the content integrity and to provide proper maintenance on the channel; thereby only the authorized content partners are given access to update RSS feeds and the content on the channel.

The RSS publishing feature allows clients 401 to publish their channels as an audio/video podcast. This allows clients 401 to automatically download their channels to multimedia devices that support podcasts through RSS, such as the iPod and iPhone manufactured by Apple Computer, PSP by Sony Electronics, and Zune by Microsoft.

Database 414 tracks all the RSS feed requests tied to a channel. There are customizable channel property fields. A last synchronized field updates the timestamp of the channel when the synchronization on the channel was successfully made. An unable to synch field represents the number of synchronization failures. Database 414 also keeps track of the number of times a client accesses the system and the access statistics thereof, e.g. time logged into the system, duration of the log-in, etc. Database 414 may also store channel-specific properties that provide limited access to the channel.

When a channel is created and an existing channel is edited, client 401 is provided with the option of linking an RSS feed to the channel. Presentation server 412 inspects the RSS feed and returns the result via a UI to client 401 regardless of whether the RSS feed URL was linked to the channel. The link to the RSS feed is further inspected for the appropriateness and the duplicity of the content referenced by the URL. If the content is deemed to be inappropriate, the download is not granted and a record is logged to database 414 associated with the channel. When there is a duplicate copy available on database 414, a proper link is created to point to the copy instead of downloading a new copy.

The RSS feed simplifies the status update on a channel as the RSS feed includes meta-information about the channel status. Therefore, the presentation server 412 does not have to look up database 414 for the current channel status. For example, synchronization history is determined by looking up the meta-information on the RSS feed instead of analyzing the timestamp of the file on the RSS feed.

According to one embodiment, the UI mechanism allows client 401 to determine the synchronization schedule. Client 401 may specify a custom schedule for synchronizing this channel or click on a synchronize now button to synchronize the channel manually. As a result, presentation server 412 informs client 401 that the channel is being synchronized. Alternatively, all channels are synchronized at predefined intervals. When the synchronization is successful, the RSS feed gets updated to reflect the changes to the channel status. The channel status is also updated on database 414, and the channel status on the RSS feed is cross-referenced to update the status. When the synchronization fails, an indicator in the UI shows that a channel cannot be synchronized: failed to synchronize. This indicator is provided to the client 401 when the number of failed synchronization attempts is more than the allowable number of trials.

The UI shows new contents available in a channel, not just an RSS channel. The UI displays thumbnails of new content and provides buttons to play them. Other software features of the UI are customizable depending on how client 401 configures the channel and personal settings.

The creator of a clip is distinguished from the owner of the channel. While clips ingested via RSS feed are owned by the system user, they are displayed as being created by the author/creator as determined from the XML feed at the ingestion time.

RSS ingestion is through publishing server 410 utilizing URL 451 and an XML, parser. Publishing server 410 exposes two publishing methods: one for immediate update of a single RSS channel, and another for updating all RSS channels. The single channel update is initiated via the UI on mobile device 402. The update-all method is initiated by a scheduler in publishing server 410 that scans database 414 for channels with an RSS feed URL, and synchronizes those channels.

When ingesting a clip, the system user is identified as the clip's owner and the clip's creator is determined from the XML feed. If individual clips are not documented, the feed-wide property is used. Ingestion is asynchronous with the UI and returns "true" when called. When a feed is synchronized, the last synchronized field of the channel is set to the current date and time and the unable to synch field is reset. If a synch attempt fails, the unable to synch field is incremented. If the number of synchronization trials exceeds the number of allowable trials, then it is assumed that the feed is dead and is not updated.

During synchronization, RSS URL is used to download the XML, file for the RSS feed from the feeds publisher. A hashing algorithm is used to compute a hash from the XML file. This hash is then compared to the hash value found the last time the system looked at this XML file. If the two hash values are the same, then no changes have occurred and no updates are needed to this channel. If the two values differ, then the XML file is parsed to produce a list of URLs. This list is a list of URLs that each points to a multimedia file that belongs to this channel. Sequentially each member of this list is checked against the database 414 to see if this URL has already been downloaded. If the URL is found in the database, then it has already been processed and is skipped. If it is not found, then the multimedia file associated with the URL is downloaded and a hash of this file is computed. The hash value is then checked to see if it exists in database 414. If the clip already exists and is in the channel, no update is necessary. If the clip already exists and is not in the channel, then it is added to the channel. If the clip does not exist, it is downloaded, transcoded, and then published into the channel.

When a channel is created or an existing channel is edited, client 401 is presented with the option to publish the channel via RSS. According to one embodiment, if this option is chosen, presentation server 412 presents client 401 with a URL which may be used as an RSS URL with any RSS client such as iTunes manufactured by Apple Computer. Presentation server 412 provides an RSS interface controller that accepts an RSS URL from a client such as iTunes, as a parameter. The RSS controller expects to be called by third-party programs. The RSS interface controller translates playlist and clip information into an XML equivalent to provide as an RSS feed to the caller.

Figure 5:
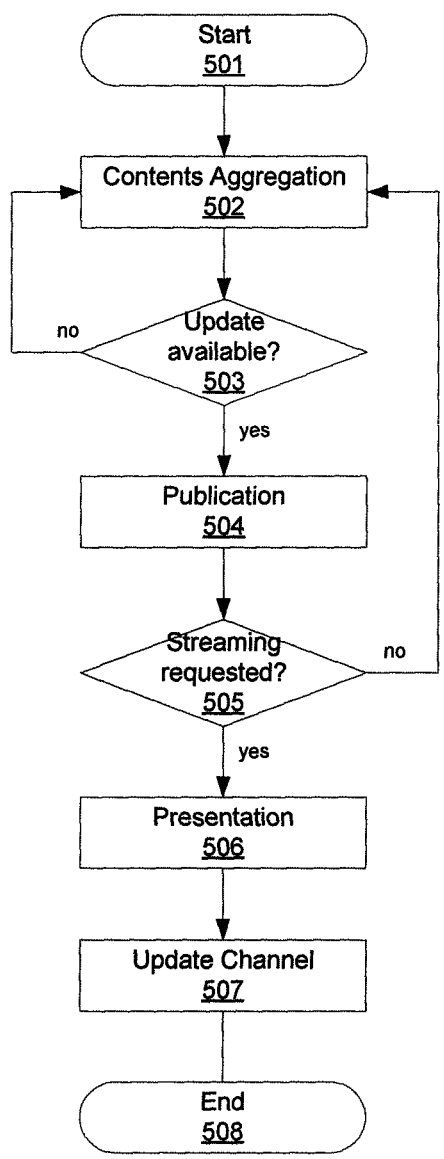
FIG. 5 illustrates exemplary RSS ingestion, publication and presentation processes, according to one embodiment.

FIG. 5 illustrates exemplary RSS ingestion, publication and presentation processes, according to one embodiment. After a channel is set up, publishing server 410 searches for an update on the channel and aggregates the update either at the request of client 401 or by automatic scheduling (502). When an update on the channel is available (503), the channel's information is updated, saved to database 414, transcoded, and published (504). Notifications of an update may be made in various ways, for example, emails, text messages, or any other information delivery mechanisms. A client sends a request for streaming of the update (505), publishing server 410 starts streaming the contents to the client and presents it in an appropriate format (506). After the streaming is completed, the record on the client channel is updated on the publishing server and the update is marked as "streamed."

Figure 6:
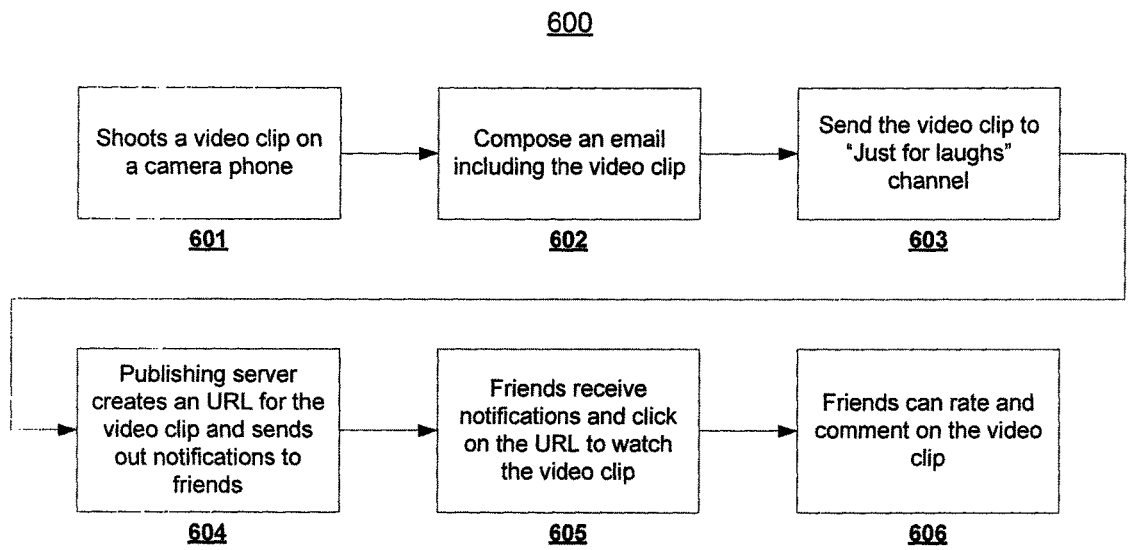
FIG. 6 illustrates an exemplary application, according to one embodiment.

FIG. 6 illustrates an exemplary application, according to one embodiment. Client 401 shoots a video clip using the internal video recorder of his or her mobile device 402. (601) The video clip is created in the mobile device 402's native format, typically a variant of MPEG-4 tailored for small-sized video formats with improved mobility and inter-compatibility. Since the video clip is created in the native format of the mobile device 402, no particular software is required to be installed thereon. Client 401 may have already created a channel or a new channel is created on publication system 400. When a new channel is created, client 401 is given a unique email address, herein referred to as an ingest address, that may be used to access the channel and transmit video clips. Client 401 sends a message, including the video clip (602), to the ingest address of the desired channel using the native media messaging system of his or her mobile device 402. In one embodiment, the native media messaging system is MMS or a carrier-provided transport mechanism such as "Picture Mail." The message is delivered to the carrier's messaging server which opens an SMTP (Simple Mail Transport Protocol) connection to messaging server 413.

In one embodiment, messaging server 413 analyzes the contents of the SMTP protocol transactions via a sendmail milter and retrieves the access rights to the channel associated with the ingest address from the database 414. If the ingest address is not identifiable, the message is rejected as spam. If messaging server 413 successfully identifies the message sender by the ingest address, the corresponding attributes of the channel are inspected to determine whether or not the message sender is granted permission to access the channel. For example, if the channel creator elected to enable anonymous submissions to the channel, the message sender is granted permission. If the channel is configured with limited accessibility, only a granted requestor can obtain permission, otherwise the request is rejected as spam. Once the permission is granted, the email is further analyzed to determine the type of messaging format and encoder used by client 401. Using the same messaging format, the email is decoded to extract the original video clip that client 401 sent to the ingest address. Publishing server 410 transcodes the video and saves the video clip on fileserver 411 in various formats and updates the channel information in database 414. At this point, the video clip is available for viewing in the channel.

Publishing server 410 looks up the list of subscribers on the channel and sends out notifications to the subscribers on the list (604). A channel subscriber can choose the frequency and the method of notification delivery; for example, the subscriber can receive a notification for every N new clips or once a day. Notification options can be configured per channel, so that the subscriber can receive a notification on one channel every day while receiving a notification on another channel for every N clips. Notification can also be made in various formats such as an SMS message, a phone call, or an email. In one embodiment, a notification is received via a text message including a URL that points to a new video clip. The subscriber watches the new video clip by clicking on the URL (605). The subscriber may rate and add comments about the video clip (606). That feedback information is transmitted to publishing server 410 where the channel information is updated. The notification arrives to the subscriber in mobile device 402's native messaging format, so that no software installation is necessary. Similarly, the new video is played with the native multimedia player on the subscriber's mobile device 402, no additional software for viewing is required, either.

Figure 7:
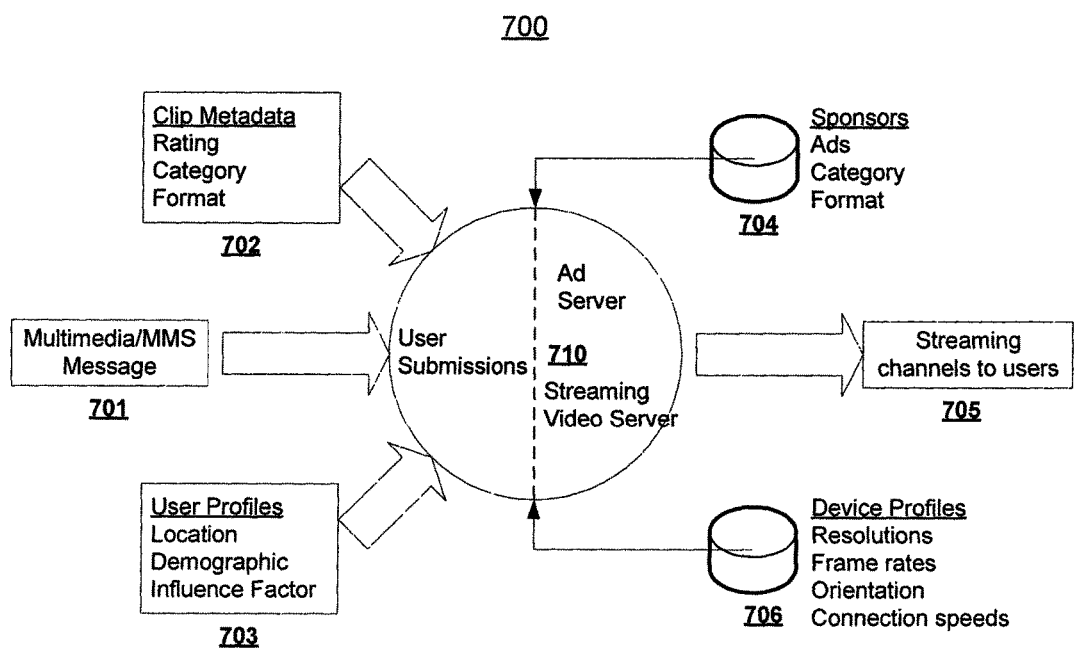
FIG. 7 illustrates an exemplary architecture for a multimedia presentation system, according to one embodiment.

FIG. 7 shows an exemplary architecture for a multimedia presentation system, according to one embodiment. Publishing server 710 receives multimedia clips or messages from client 701. The multimedia clips include metadata such as rating, category, and formats (702). The client's profile such as the location, demographic data, and influence factor (703) is tagged with the multimedia clips. According to one embodiment, publishing server 710 also includes a database containing sponsor advertisement clips (704). Advertisement clips are also categorized and formatted for streaming. The video clips updated by client 701 and advertisement clips are stitched together as described in RTSP system 100 and streamed to clients subscribing to the channel (705). Advertisement clips of a similar category as the multimedia clips are chosen to be stitched together to expose the most relevant advertisement to the interest of the clients. For example, if the video clip is categorized as "animal", then the advertisement of a pet shop might be appealing to the subscribers of "animal" video clips. The pet shop advertisement is chosen to be stitched with the "animal" video clip. The subscribing clients may receive formats in various resolution, frame rates, orientation and connection speeds depending on the mobile device and personal configurations (706).

Layered Architecture for Virtual Applications (LAVA)

The present system and method allows users to submit videos, pictures or other contents and share them with friends and family. According to one embodiment, a methodology called Layered Architecture for Virtual Applications (LAVA) is used. Unlike more traditional Web programming methods, LAVA utilizes a number of interlinked servers performing unrelated tasks tied together via an interserver messaging Application Program Interface (API) based on simple web services. The servers themselves implement a series of state machines. Persistent information of the servers is stored in one or more databases. The combination of the persistent information with a presentation layer provided by a presentation server or implemented natively on the client's device provides for a virtual application experience. The user's virtual experience of using an application is an emergent effect of the outcome of the diverse back end processes.

Client 401 sends videos and pictures to publishing server 410 via email. The email conversation is moderated via the sendmail milter interface, which implements two components: a parsing and analyzing process for email, and a Web service integrated into the back-end messaging system. The two-component interface allows very complicated parsing in a high-level language yet maintains the scalability of the low-level language.

Inbound emails arrive at messaging server 413 including not only videos or pictures but also other commands, messages, or registration requests from client 401. The parser of the milter interface filters the inbound emails and determines appropriate actions to take.

Publishing consists of meta-information collection, transcoding, and storage. Meta-information is both parsed from the email message and generated from data held in database 414. Media content is transcoded into formats appropriate for streaming. The resulting files are then stored on file server 411 and their meta-information such as size, format, category, etc. in database 114, and channel information is updated therein.

According to one embodiment, presentation server 412 runs an Asynchronous Javascript and XML (AJAX) application on compatible Web browsers such as Internet Explorer, Firefox or Opera, etc. An AJAX application provides a drag-and-drop interface for creating and manipulating channels and editing comments, clips, and user information. An AJAX application also maintains its own internal local state and requests back-end servers to act on its behalf. Such transactions are requested utilizing Web APIs exposed through presentation server 412. For example, the "RUBY on Rails" programming framework is used to construct the Web API. The presentation UIs are provided by programming languages such as RUBY, Javascript and HTML.

According to another embodiment, a Wireless Application Protocol (WAP) application runs on a small Web platform such as the Blazer Web browser on a mobile device 402. The WAP application consists of a native binary and an embedded description file. The description file contains an encoded key, which is a cryptographic identification representing client 401's identity. The application launches a Web browser and presents the key along with an initial URL that is populated to the back-end servers including publishing server 410, file server 411, presentation server 412, messaging server 413 or playlist server 111. The WAP application uses mobile device 402's native resources, Web browsers, and players to provide user interface.

In a WAP application, each request causes a transaction that generates two separate results: a user interpretable response and an encoded information representation that may be embedded in URLs. This encoded representation carries the application state i.e. the users id, and cryptographic token verifying the users identity as well as various state variables which define the users recent actions and requests. These two responses are blended together by the presentation server to form an Extensible HTML (XHTML) page that can be interpreted by a small web browser such as Blazer.

The presentation server may also talk to a native application on devices such as cell phones, PDAs, BlackBerry®s, or any other multimedia devices. It uses similar cryptographic and state keeping facilities. However, the native application may implement its own player and presentation services.

Any number of potential view and application services are possible utilizing the back-end servers. Various Web servers, publishing servers, and mail handling servers are coordinated by an intercommunication server. At its start, each server broadcasts a request and identification. The coordinator informs it of its configuration and stores it in the database. At measured intervals, the server records in a status table its current load and other status information and maintains the table. In the event of a server not responding, the coordination server takes appropriate action such as marking unresponsive servers as unavailable and informing human administrative staff that an action is required.

Figure 8:
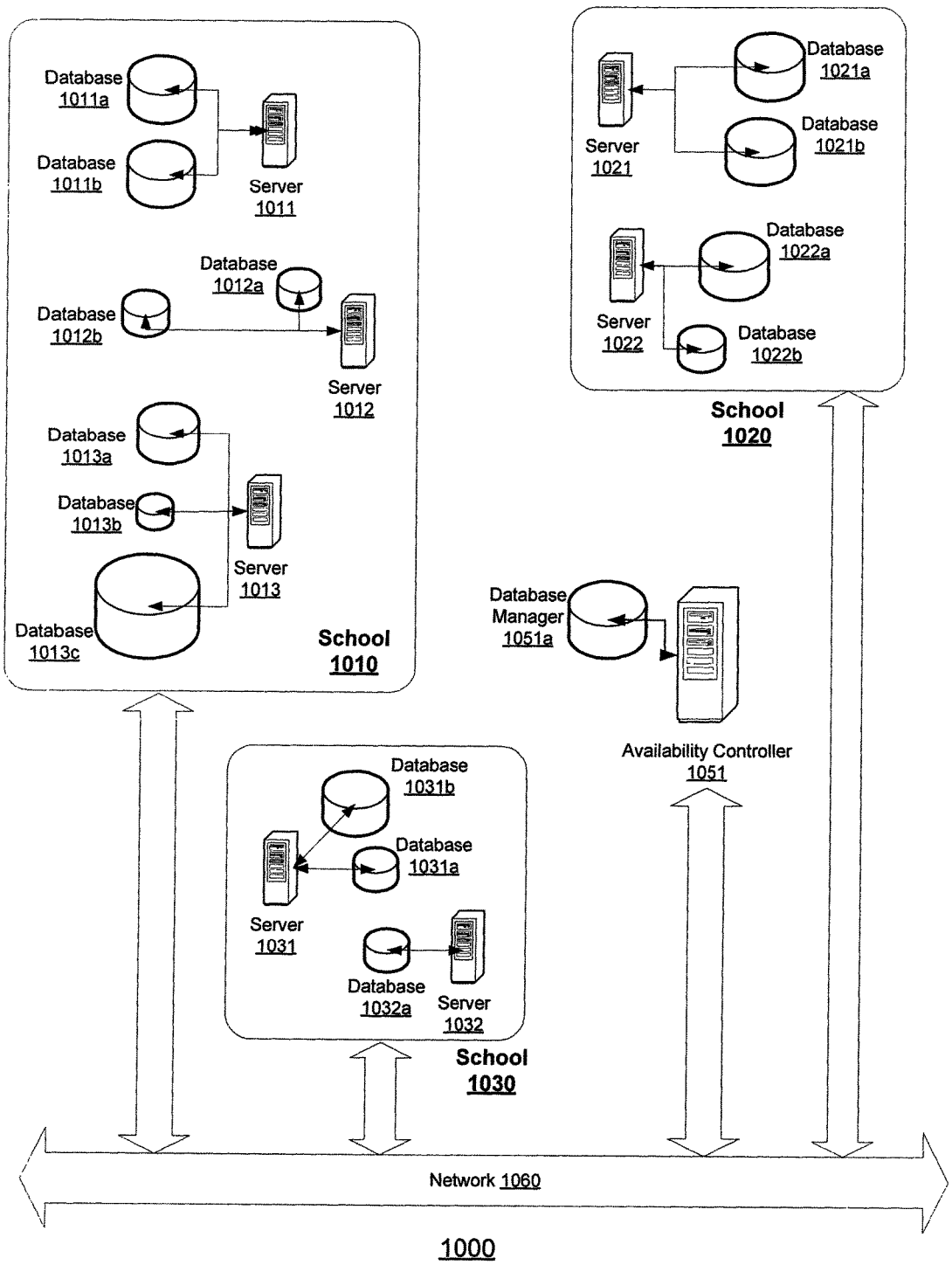
FIG. 8 illustrates an exemplary clustered storage system, according to one embodiment.

FIG. 8 shows an exemplary clustered file storage system 1000. Clustered file storage system 1000 comprises one or more schools and each school comprises one or more storage servers. Each storage server has one or more storage devices denoted as databases. For example, school 1010 comprises three storage servers 1011, 1012, and 1013. Three databases, 1013*a*, 1013*b*, and 1013*c* are connected to storage server 1013. Each storage server is connected to network 1060 to serve as a network storage device. As the service area and the population enlarge, clone schools and servers might be strategically located over geographical regions to better serve clients from different regions.

According to one embodiment, a school may be a collection of one or more file servers to which duplicate copies of files are systematically distributed. Each file server that is connected to the network may operate as a publishing server, as shown in FIG. 4. Any individual file is stored on a minimum of two servers for data persistency. For example, duplicate copies of "file A" are stored on database 1013*a* and 1012*b*. If server 13 is not available, then "file A" can still be recovered via server 12. The specific locations where "file A" is stored on the clustered file storage system 1000 are recorded to availability controller 1051 and database manager 1051*a*.

For another example, server 1012 tries to locate a file called "file B." Server 1012 promptly searches its own databases 1012*a* and 1012*b* to see if "file B" is locally stored. If "file B" is not found, then server 1012 talks to availability controller 1051 for the specific locations of "file B." If "file B" was found on another server 1031—then availability controller 1051 returns the file location and the hosting server 1031 back to server 1012. If server 1031 is not available immediately, a second server 1032 is queried to return the copy of "file B." When a matching file "file B" is found on either of the servers, then server 1012 directly exchanges the file with the hosting server without connecting through availability controller 1051.

When a request to save a new file arrives, availability controller 1051 assigns the school and the servers, thereby the databases, where the file is to be hosted and stored. If the new file is an update on an existing channel that is already hosted on a school or a server, then the file is stored on the same school or server for maximum maintainability. As the files are updated, the history of the update is recorded and maintained by availability controller 1051 on database manager 1051*a*.

Clustered file storage system has advantages over the monolithic redundant storage systems where a single server processes the file transaction. Redundant copies on redundant servers greatly improves the reliability of the system. Scalability is also enhanced as the capacity of file storage increases, as more servers and schools can be added without sacrificing the performance of the existing servers. Maintainability is also enhanced, as a server in a school can be shut down for maintenance while other servers in the school are still operating and servicing clients.

According to one embodiment, this clustered file storage system is used in RTSP system 100 and RSS system 400.

An apparatus and method for dynamic streaming of multimedia files have been described with respect to specific example and subsystems. It will be apparent to those of ordinary skill in the art that it is not limited to these specific examples or subsystems but extends to other embodiments as well.

What is claimed is:

1. A computer-implemented method, comprising:
a processor calculating an accumulated play time of a set of multimedia files stored on a tangible storage medium; and
constructing a single virtual multimedia file by modifying headers of individual video and audio segments of the set of stored multimedia files to stream as a single virtual file over a file delivery network using a single Real Time Streaming Protocol (RTSP) connection having a single Real-time Transport Protocol (RTP) and Real-Time Control Protocol (RTCP) port pair;

wherein each file of the set of multimedia files meets one or more criteria;

constructing a playlist from the set of multimedia files by:
  determining preferred characteristics of the playlist based on at least one of a client device type and a status of the file delivery network;
  for each file of the set multimedia files, in the case the preferred characteristics of the playlist do not match corresponding characteristics of the file, generating a preferred copy of the file having the preferred characteristics; and
  constructing a playlist having the preferred characteristics using the preferred file copies and files of the set of multimedia files that have the preferred characteristics.

2. The computer-implemented method of claim 1, further comprising:
  streaming the single virtual multimedia file to a client device in response to a request from the client device to stream a playlist; and
  prior to the streaming, providing to the client device one or more notifications that the playlist is available, the one or more notifications comprising at least one of an e-mail and a short message service (SMS) text message.

3. The computer-implemented method of claim 1, further comprising:
  identifying files of the set of multimedia files from one or more network locations identified based on a single Uniform Resource Locator (URL) prior to storing the set of multimedia files on the storage medium.

4. The computer-implemented method of claim 1, further comprising updating a database to indicate that a client device streamed at least a portion of the playlist.

5. The computer-implemented method of claim 1, wherein the
  preferred characteristics of the playlist include at least a frame rate and a resolution.

6. The computer-implemented method of claim 5, further comprising:
  receiving an update notice that references at least one new multimedia file that meets the one or more criteria; and
  reconstructing the playlist using the set of multimedia files and the at least one new multimedia file.

7. The computer-implemented method of claim 1, wherein a sum of the individual video segments and a sum of the individual audio segments are different for at least one of the multimedia files.

8. The computer-implemented method of claim 6, wherein the reconstructing the playlist by modifying the headers of the individual video and audio segments occurs while streaming the playlist.

9. A non-transitory computer readable storage medium encoded with a computer program, the program comprising instructions that when executed by a data processing apparatus cause the data processing apparatus to perform:
  calculating an accumulated play time of a set of multimedia files stored on a tangible storage medium; and
  constructing a single virtual multimedia file by modifying headers of individual video and audio segments of the set of stored multimedia files to stream as a single virtual file over a file delivery network using a single Real Time Streaming Protocol (RTSP) connection having a single Real-time Transport Protocol (RTP) and Real-Time Control Protocol (RTCP) port pair;
  ensuring each file of the set of multimedia files meets one or more criteria, and
  constructing a playlist from the set of multimedia files by:
    determining preferred characteristics of the playlist based on at least one of a client device type and a status of the file delivery network;
    for each file of the set multimedia files, in the case the preferred characteristics of the playlist do not match corresponding characteristics of the file, generating a preferred copy of the file having the preferred characteristics; and
    constructing a playlist having the preferred characteristics using the preferred file copies and files of the set of multimedia files that have the preferred characteristics.

10. The non-transitory computer readable storage medium of claim 9, wherein the instructions further cause the data processing apparatus to perform:
  streaming the single virtual multimedia file to a client device in response to a request from the client device to stream a playlist; and
  prior to the streaming, providing to the client device one or more notifications that the playlist is available, the one or more notifications comprising at least one of an e-mail and a short message service (SMS) text message.

11. The non-transitory computer readable storage medium of claim 9 wherein the
  preferred characteristics of the playlist include at least a frame rate and a resolution.

12. A system, comprising:
  a server that communicates with a client device, wherein the server is a data processing apparatus, the server configured to:
  calculate an accumulated play time of a set of multimedia files stored on a tangible storage medium; and
  construct a single virtual multimedia files by modifying headers of individual video and audio segments of the set of stored multimedia files to stream as a single virtual file over a file delivery network using a single Real Time Streaming Protocol (RTSP) connection having a single Real-time Transport Protocol (RTP) and Real-Time Control Protocol (RTCP) port pair;
  wherein each file of the set of multimedia files meets one or more criteria, the server further configured to:
  construct a playlist from the set of multimedia files by:
    determining preferred characteristics of the playlist based on at least one of a client device type and a status of the file delivery network;
    for each file of the set multimedia files, in the case the preferred characteristics of the playlist do not match corresponding characteristics of the file, generating a preferred copy of the file having the preferred characteristics; and
  constructing a playlist having the preferred characteristics using the preferred file copies and files of the set of multimedia files that have the preferred characteristics.

13. The system of claim 12, the server further configured to:
  stream the single virtual multimedia file to the client device in response to a request from the client device to stream a playlist.

14. The system of claim 12, the server further configured to:

identify files of the set of multimedia files from one or more network locations identified based on a single Uniform Resource Locator (URL) prior to storing the set of multimedia files on the storage medium.

15. The system of claim 12, the server further configured to update a database to indicate that a client device streamed at least a portion of the playlist.

16. The system of claim 12, wherein the preferred characteristics of the playlist include at least a frame rate and a resolution.

17. The system of claim 16, the server further configured to:

receive an update notice that references at least one new multimedia file that meets the one or more criteria; and reconstruct the playlist using the set of multimedia files and the at least one new multimedia file.

18. The system of claim 17, wherein the reconstructing the playlist by modifying the headers of the individual video and audio segments occurs while streaming the playlist.

19. The computer-implemented method of claim 1, wherein the single virtual multimedia file is streamed to the client device in a format formatted for at least one of the device's resolution, and connection speed.

20. The computer-implemented method of claim 1, further comprising dynamically transcoding at least one of the set of multimedia files and using the transcoded file to generate the single virtual multimedia file.

* * * * *